(12) United States Patent
Krasnov et al.

(10) Patent No.: US 7,510,582 B2
(45) Date of Patent: *Mar. 31, 2009

(54) METHOD OF FABRICATING THIN FILM BATTERY WITH ANNEALED SUBSTRATE

(76) Inventors: Victor Krasnov, 18701 Hatteras St., #2, Tarzana, CA (US) 91356; Kai-Wei Nieh, 640 Ranchito Rd., Monrovia, CA (US) 91016; Su-Jen Ting, 3715 Green Vista Dr., Encino, CA (US) 91436

( * ) Notice: Subject to any disclaimer, the term of this patent is extended or adjusted under 35 U.S.C. 154(b) by 0 days.

This patent is subject to a terminal disclaimer.

(21) Appl. No.: 11/681,756

(22) Filed: Mar. 2, 2007

(65) Prior Publication Data

US 2007/0166612 A1    Jul. 19, 2007

Related U.S. Application Data

(60) Continuation of application No. 11/007,362, filed on Dec. 7, 2004, now Pat. No. 7,186,479, which is a continuation of application No. 10/639,206, filed on Aug. 12, 2003, now Pat. No. 6,921,464, which is a division of application No. 09/656,012, filed on Sep. 7, 2000, now Pat. No. 6,632,563.

(51) Int. Cl.
*H01M 6/12* (2006.01)
*H01M 10/04* (2006.01)
*C23C 14/35* (2006.01)

(52) U.S. Cl. ............... 29/623.1; 29/623.5; 204/192.15; 427/126.3

(58) Field of Classification Search ............. 29/623.1, 29/623.5; 204/192.15; 427/126.3
See application file for complete search history.

(56) References Cited

U.S. PATENT DOCUMENTS

| | | | | |
|---|---|---|---|---|
| 3,375,135 A | * | 3/1968 | Moulton et al. | 429/50 |
| 4,871,433 A | * | 10/1989 | Wagner et al. | 204/192.12 |
| 6,280,875 B1 | * | 8/2001 | Kwak et al. | 429/162 |
| 6,921,464 B2 | * | 7/2005 | Krasnov et al. | 204/192.22 |

FOREIGN PATENT DOCUMENTS

FR    2403652 A  *  5/1979

OTHER PUBLICATIONS

Antaya et al. "Preparation and Characterization of LiCoO2 Thin Films by Laser Ablation", J.Electrochem. Soc., vol. 140, No. 3, Mar. 1993. pp. 575-578.*

(Continued)

*Primary Examiner*—Gregg Cantelmo
(74) *Attorney, Agent, or Firm*—Ashok Janah; Janah & Associates

(57) ABSTRACT

A thin film battery manufacturing method comprises annealing a battery substrate to a temperature at which organic materials are burned off the battery substrate to clean the battery substrate. The battery substrate comprises a thickness of less than about 100 microns. After annealing, a plurality of thin films are formed on the annealed battery substrate, the thin films comprising at least one electrolyte between a pair of electrodes, and the thin films adapted to generate or store an electrical charge. The thin films can also be annealed to remove defects in the thin films.

16 Claims, 3 Drawing Sheets

OTHER PUBLICATIONS

Fragnaud et al. "Characterization of Sprayed and Sputter Deposited $LiCoO_2$ Thin Films for Rechargeable Microbatteries", J. Power Sources, 63 (1996). pp. 187-191.*

Birke et al. "Materials for Lithium Thin-Film Batteries for Application in Silicon Technology", Solid State Ionics, 93 (1997). pp. 1-15.*

Benqlilou-Moudden et al. "Amorphous Lithium Cobalt and Nickel Oxides Thin Films" Preparation and Characterization by RBS and PIGE. Thin Solid Films 333 (1998). pp. 16-19.*

* cited by examiner

METHOD OF FABRICATING THIN FILM BATTERY WITH ANNEALED SUBSTRATE

CROSS-REFERENCE

This application is a continuation of application Ser. No. 11/007,362, now U.S. Pat. No. 7,186,479, filed on Dec. 7, 2004, which is a continuation of application Ser. No. 10/639,206, now U.S. Pat. No. 6,921,464, filed Aug. 12, 2003, which is a divisional of application Ser. No. 09/656,012, now U.S. Pat. No. 6,632,563, filed Sep. 7, 2000; all of which are incorporated by reference herein in their entireties.

BACKGROUND

The invention relates to a thin film battery and its method of manufacture.

A thin film battery typically comprises a substrate having one or more thin films thereon, which may serve as, for example, current collectors, a cathode, an anode, and an electrolyte, that cooperate to store electrical charge to generate a voltage. The thin film batteries typically are less than about $1/100^{th}$ of the thickness of conventional batteries. The thin films are typically formed by thin film fabrication processes, such as for example, physical or chemical vapor deposition methods (PVD or CVD), oxidation, nitridation or electro-plating. The substrate material is selected to provide good dielectric properties and good mechanical strength. Suitable substrate materials may include for example, oxides such as aluminum oxide and silicon dioxide; metals such as titanium and stainless steel; and semiconductors such as silicon.

However, conventional substrate materials often limit the ability of the battery to store electrical energy to achieve high energy density or specific energy levels. The energy density level is energy level per unit volume of the battery. The specific energy level is the energy level per unit weight of the battery. Conventional batteries typically achieve energy density levels of 200 to 350 Whr/L and specific energy levels of 30 to 120 Whr/L. However, it is desirable to have a thin film battery that provides higher energy density and specific energy levels to provide more power per unit weight or volume.

The ability to achieve higher energy levels is also enhanced by forming a crystalline cathode film on the substrate. The crystalline cathode film can also provide better charging and discharging rates. However, it is difficult to fabricate thin film batteries having crystalline cathode films on the substrate. Typically, the cathode is a thin film deposited on the substrate in the amorphous or microcrystalline form, and thereafter, crystallized by annealing at high temperatures. For example, an amorphous or microcrystalline film of $LiCoO_2$ is typically annealed at about 700° C. to obtain a crystalline $LiCoO_2$ cathode film. However, the higher annealing temperature constrains the types of materials that may be used to form the other thin films on the substrate. The other thin film materials should not, for example, soften, melt, oxidize, or inter-diffuse at annealing temperatures. The annealing process may also generate thermal stresses that arise from the difference in thermal expansion coefficient of the substrate, cathode, and current collector, resulting in delamination or peeling off of the thin films or even the entire thin film battery structure. Thus, conventional methods are often deficient in their ability to fabricate the crystalline cathode film of the thin film battery.

Thus it is desirable to have a thin film battery capable of providing relatively high energy density and specific energy levels. It is also desirable to reduce the temperatures of fabrication of the crystalline thin film materials, especially in the fabrication of cathode comprising $LiCoO_2$.

DRAWINGS

These and other features, aspects, and advantages of the present invention will become better understood with reference to the following description, appended claims, and accompanying drawings, which illustrate embodiments of the present invention that may be used separately or in combination with one another, where:

DESCRIPTION

Figure 1:
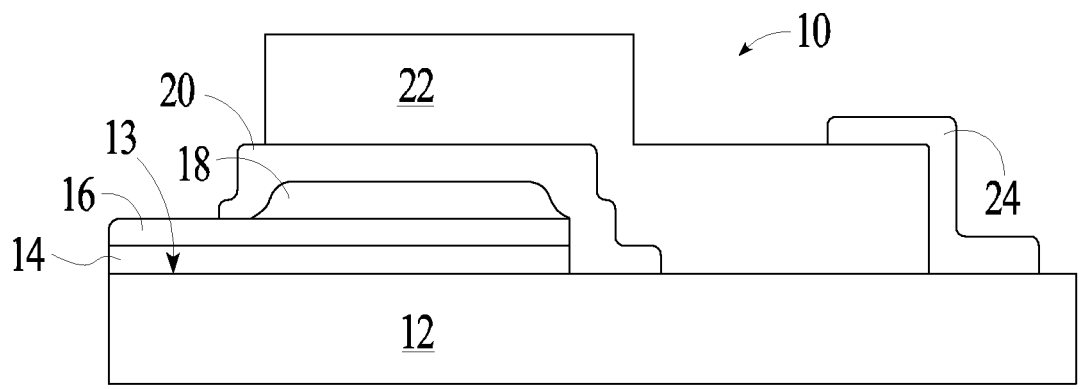
FIG. 1 is a schematic cross-sectional view of an embodiment of a thin film battery.

An embodiment of a battery 10 having features of the present invention is illustrated in FIG. 1. The battery 10 is formed on a substrate 12 which can be an insulator, a semiconductor, or a conductor. The substrate 12 should also have sufficient mechanical strength to support the thin films during processing or operational temperatures. For example, the substrate 12 can comprise silicon dioxide, aluminum oxide, titanium, or a polymer.

In one embodiment, which may be used by itself, or in combination with any of the other features or methods described herein, the substrate 12 comprises a thickness of less than about 100 microns, and more preferably less than 25 microns. The thinner substrate 12 reduces the total weight and volume of the battery and yet is sufficiently strong to provide the desired mechanical support for the battery structure. A preferred substrate material comprises mica, which may be fabricated into a thin substrate of less than 100 microns with good tensile strength. Mica is typically a muscovite material, which is a layered silicate with a typical stoichiometry of $KAl_3Si_3O_{10}(OH)_2$. Mica typically has a flat six-sided monoclinical crystalline structure with good cleavage properties in the direction of the large planar surfaces. Because of this crystal structure, mica may be split into thin foils along its cleavage direction to provide thin substrates having surfaces which are smoother than most chemically or mechanically polished surfaces, which is advantageous for the fabrication of thin films on the substrate. Chemically, mica is stable and inert to the action of most acids, water, alkalis and common solvents. Electrically, mica has good dielectric strength, a uniform dielectric constant, and low electrical power loss factors. Mica is also stable at high temperatures of up to 600° C. By using mica, thin substrates may be fabricated to provide lighter and smaller batteries with relatively higher energy density levels. Mica also provides good physical and chemical characteristics for processing of the thin films formed on the substrate, in a CVD or PVD chamber, such as for example, a magnetron sputtering chamber.

Referring to FIG. 1, a typical battery 10 includes a first adhesion layer 14 deposited on a substrate 12 to improve adhesion of the other thin films formed on the substrate 12. The adhesion layer 14 can comprise a metal such as, for example, titanium, cobalt, aluminum, other metals, or a ceramic material such as, for example, LiCoO$_x$, which may comprise a stoichiometry of LiCoO$_2$. A first current collector 16 is formed over the adhesion layer 14. The current collector 16 is typically a conductive layer which may comprise a non-reactive metal such as silver, gold, platinum or aluminum. The first current collector 16 may also comprise the same metal as the adhesion layer 14 in a thickness that is sufficiently high to provide the desired electrical conductivity.

A first electrode 18 comprising an electrochemically active material may be deposited over the first current collector 16. For example, the first electrode film 18 may comprise an amorphous vanadium pentoxide, V$_2$O$_5$, or one of several lithium intercalation compounds that may be deposited in thin-film form, such as crystalline TiS$_2$, LiMn$_2$O$_2$ or LiCoO$_2$. In one exemplary embodiment, a crystalline LiCoO$_2$ film is deposited upon the current collector 16 by RF or DC magnetron sputtering to serve as the first electrode or cathode. An electrolyte film 20 is formed over the first electrode 18. The electrolyte film 20 may be, for example, an amorphous lithium phosphorus oxynitride film otherwise known as a Lipon™ film, Dupont de Nemours, Wilmington, Del. An anode or second electrode 22 is deposited over the electrolyte film 20 and a second current collector 24 is deposited on the second electrode 22 and the substrate 12. Further layers may be formed to provide additional protection.

In yet another embodiment of the present invention, which also may be used by itself, or in combination with any of the other features or methods described herein, the first electrode film 18 comprises a crystalline lithium metal oxide film, such as a LiCoO$_2$ film. The crystalline LiCoO$_2$ film can be fabricated at low temperatures preferably below 600° C. by a PVD process, such as RF or DC magnetron sputtering with a high plasma density, as provided herein.

Figure 2:
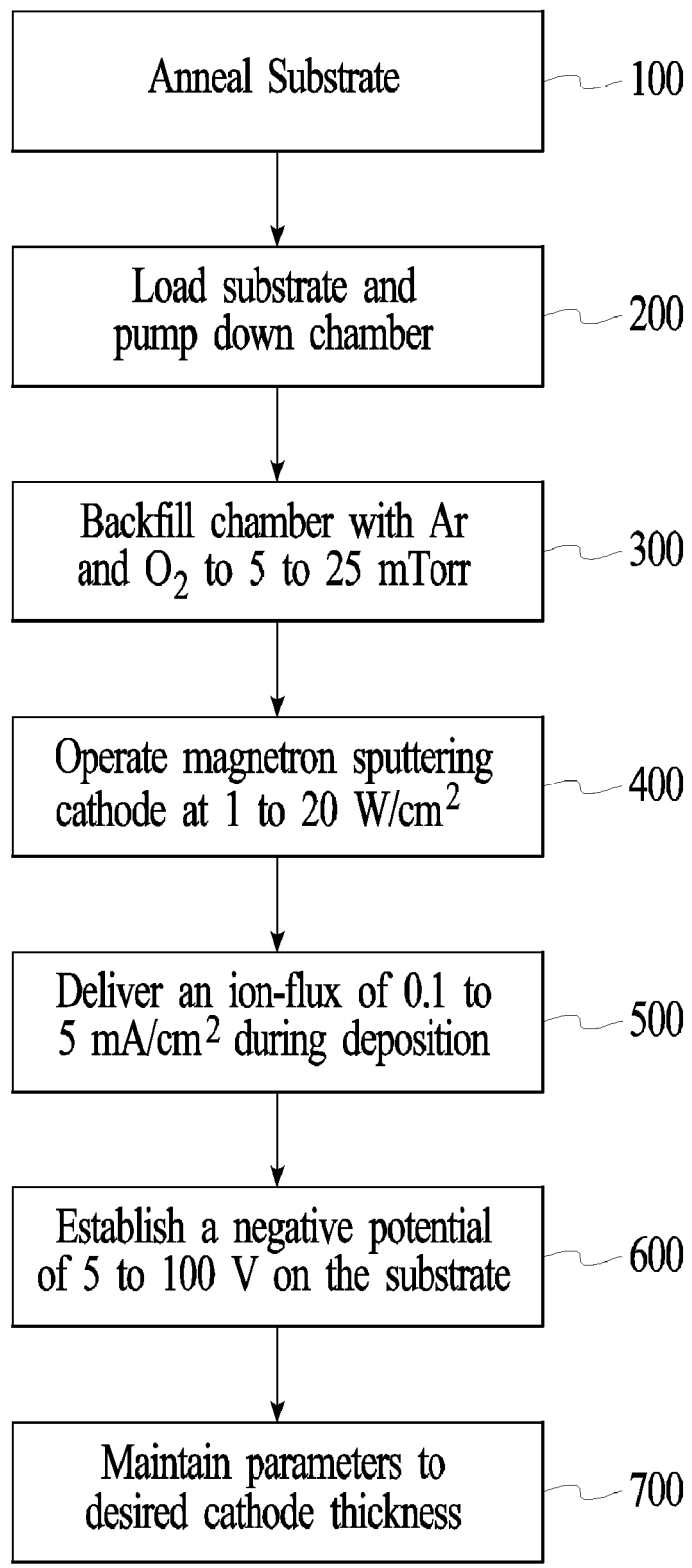
FIG. 2 is a flow chart of an embodiment of a method of fabricating a thin film battery.

FIG. 2 illustrates the method of making a thin film battery according to the present invention. In the initial step, step 100, the substrate is heated to about 400° C. in air for about 10 minutes to clean the substrate 12 by burning off organic materials which may be formed on the substrate 12. Subsequently, the thin film layers of the battery are deposited on the substrate 12. One or more of the thin films may be adapted to generate or store an electrical charge.

Figure 3:
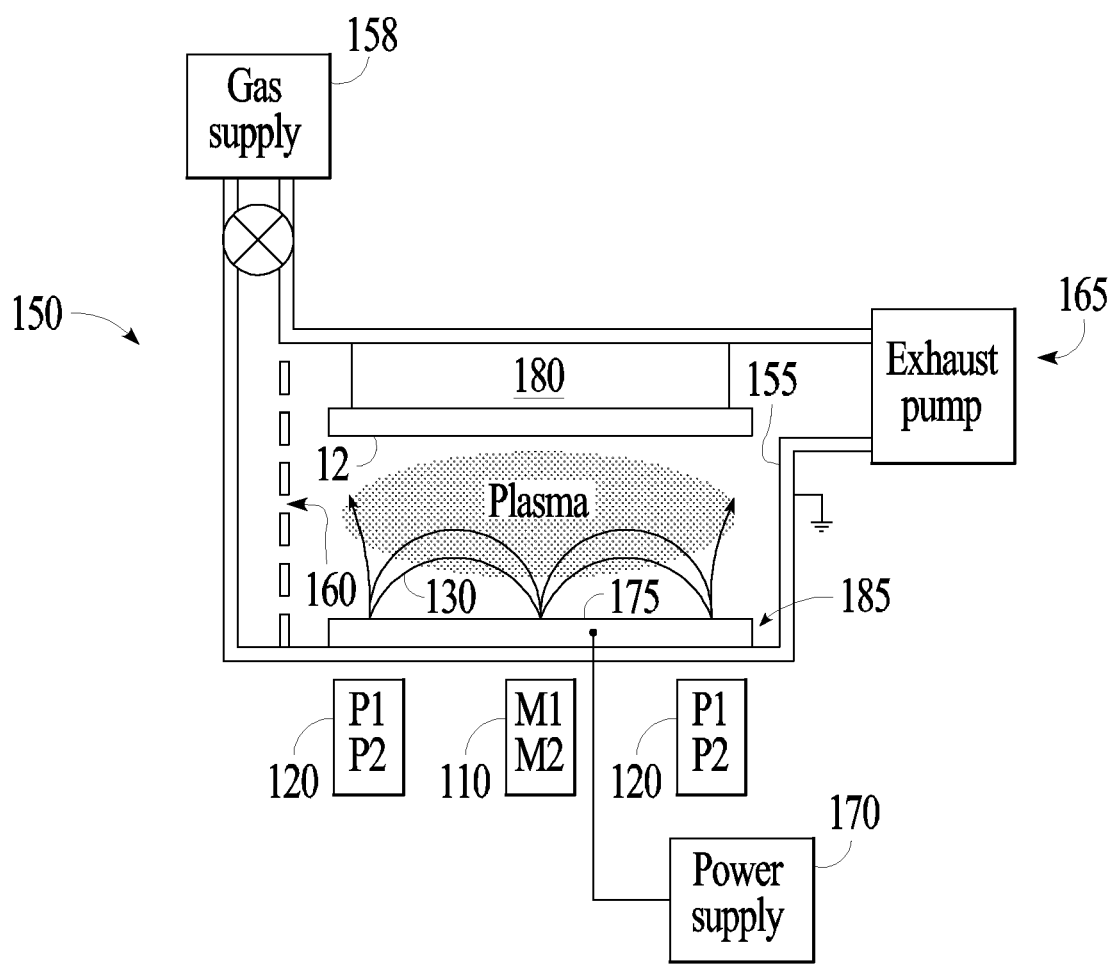
FIG. 3 is a schematic diagram of a magnetron sputtering cathode apparatus.

In one method, the substrate is placed in a magnetron PVD chamber 150 as shown in FIG. 3, which is pumped down to 1×10$^{-5}$ Torr, step 200. A suitable substrate comprises an array of 35 mm×62 mm sheets of mica. The chamber 150 comprises walls 155, a gas supply 158 connected to a gas distributor 160, a gas exhaust 165, and a power supply 170 to apply a power to a target 175. A substrate fixture 180 with the substrate 12 thereon is carried into the processing chamber 150 by a conveyor and positioned facing the target 175. The substrate holding fixture 180 is electrically isolated from the chamber walls 155 which are typically electrically grounded. The process chamber 150 is separated from a loading chamber (not shown) by a slit valve (also not shown). The process chamber 150 typically comprises a volume of about 24 sq ft with dimensions of about 4'×6'×1'. The sputtering targets 175 are sized about 5"×25". The process gas distributor 160 is provided for distributing process gas into the chamber 150. A process gas, such as for example, argon and oxygen, may be introduced into the chamber 150 to serve as the sputtering gas. The sputtering gas is maintained in the chamber 150 at a pressure of from about 5 to about 25 mTorr, in step 300, and provided at a flow rate ratio of Ar/O$_2$ of from about 1 to about 45.

A high density plasma is generated in the chamber 150 by a magnetron sputtering cathode 185. The plasma is formed over an area that is sufficiently large to coat the entire substrate 12, for example, an area of about 8"×about 25". In one version, the magnetron cathode 185 comprises central magnets 110 that provide a weaker magnetic field than the surrounding peripheral magnets 120. Both the peripheral and central magnets, 110, 120 have a polarity of south facing the chamber 150 and north facing away from the chamber 150. In this configuration, the magnetic field 130 generated by the magnets 120 is not confined to near the magnetron cathode surface 185. Instead, the magnetic field lines 130 extend to near the substrate 12. Secondary electrons follow the magnetic field lines to near the substrate surface to create high-density plasma in this area. In one version, the magnets 120 are arranged about a perimeter of the target 175. Thus, the distribution of plasma ions about the substrate 12 may be controlled with the magnetic field 130.

To deposit a film of LiCoO$_x$ on the substrate 12, a target 175 comprising LiCoO$_2$ is installed in the chamber 150 and the magnetron-sputtering cathode 185 is operated at a power density level of from about 0.1 to about 20 W/cm$^2$, step 400. In conjunction with operating the cathode 185, an ion flux of from about 0.1 to about 5 mA/cm$^2$ is delivered to the substrate 12 upon which the LiCoO$_x$ film is being deposited, step 500. During deposition, a negative potential of 5 to 100 V on the substrate 12 is established with respect to the plasma, step 600. The potential can be established either by using an external power supply or by electrically floating the substrate holding fixture 180. The parameters of the deposition process are maintained until the desired film thickness is reached, step 700. The temperature of the substrate 12 during the deposition process is estimated to be from about 100 to about 200° C.

Figure 4:
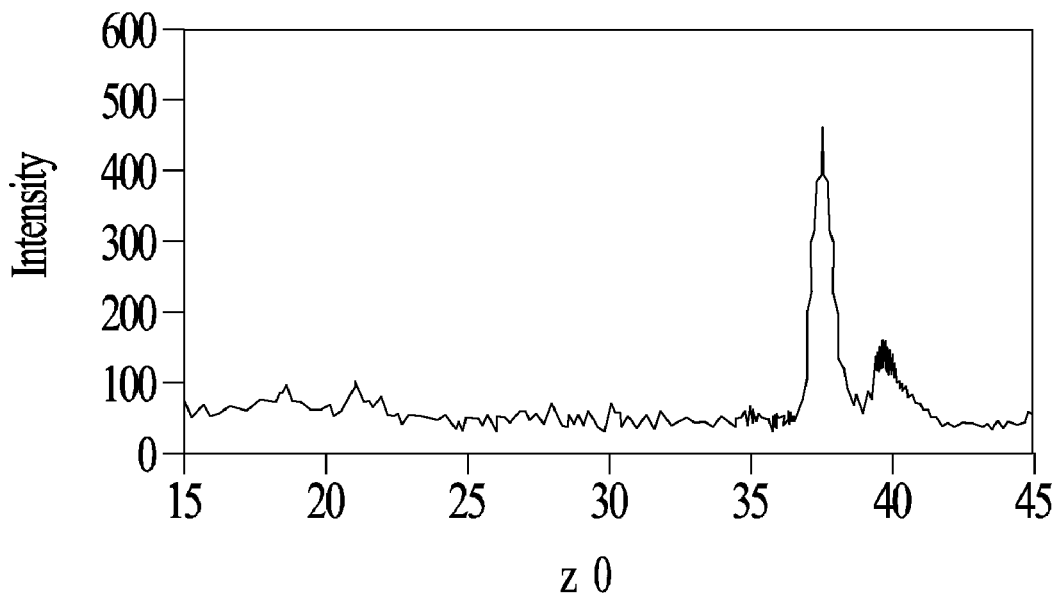
FIG. 4 is an x-ray diffraction pattern of an as-deposited $LiCoO_2$ film showing that the film is highly crystalline and with a (110) preferred orientation.

In one version the as-deposited LiCoO$_x$ film fabricated according to the present method comprises LiCoO$_2$ which is crystalline with a strong (101) preferred orientation and with a small amount of (012) oriented grains. FIG. 4 shows a typical x-ray two theta diffraction pattern of the as-deposited LiCoO$_2$ film showing that the film is highly crystalline and with a (101) preferred orientation. The substrate 12 was slightly tilted when taking x-ray diffraction in order to suppress the diffraction peaks from the mica substrate to better reveal the property of the LiCoO$_2$ film. It is believed that the crystalline material was deposited due to a combination of plasma heating, oxygen activation and plasma enhanced nucleation and growth processes. The as deposited crystalline material was a good cathode material.

Optionally, the cathode film formed on the substrate may be annealed to further improve the quality of the cathode film. The annealing step was found to increase the battery capacity by 10 to 20%, increase the charge and discharge current by more than 50%, and improve the resistance to moisture. These attributes arise from the elimination of point defects and the reduction of electrical contact resistances in the cathode material.

Under lower gas pressure levels of about 5 mTorr, the preferred orientation changes to (012) and (104). The (012) and (104) oriented material can still be used as cathode, however, with smaller energy capacity compared to the (101) oriented material. The annealing process is typically performed at a low temperature of from about 150 to about 600° C.

Figure 5:
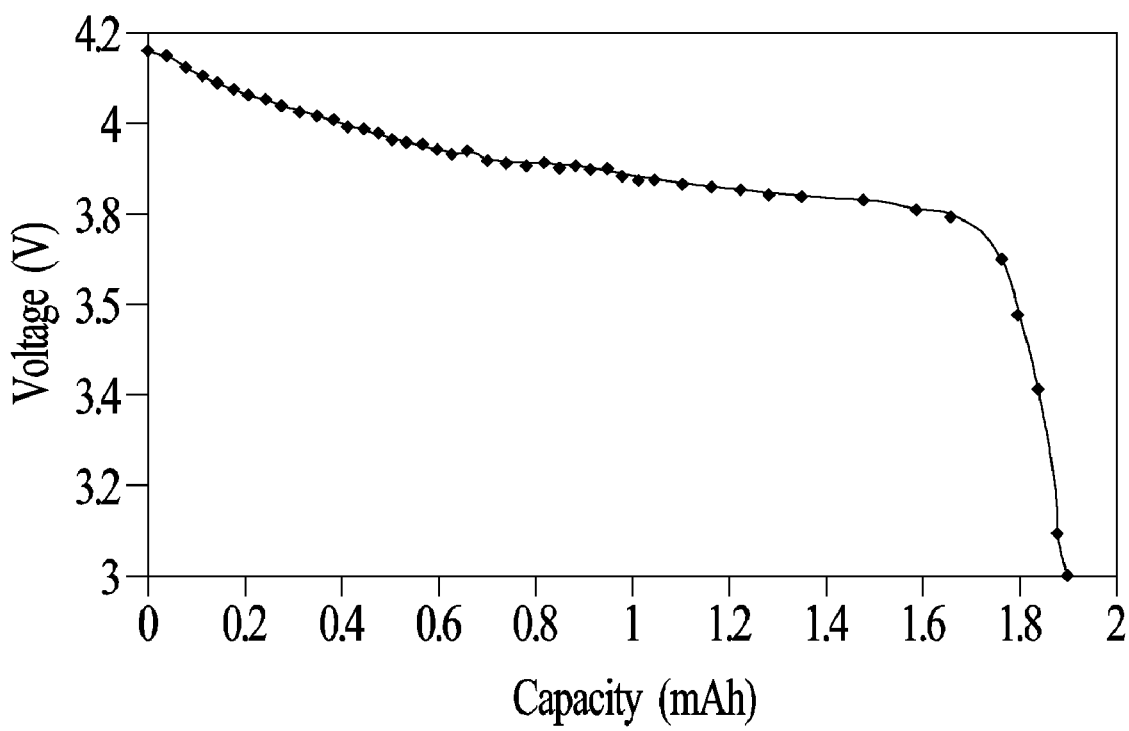
FIG. 5 is a discharge curve of a thin film battery having a crystalline $LiCoO_2$ cathode.

FIG. 5 is a typical discharge curve of a 15 cm$^2$ thin film battery of the present invention. The battery 10 comprised a 10 µm thick mica substrate with a crystalline LiCoO$_2$ cathode layer that is close to 2 µm. The capacity of the battery 10, as shown in FIG. 5, is about 1.9 mAh. Thus, the capacity of the cathode is calculated to be 0.07 mAh/cm$^2$./µm, which is close to the theoretical number for crystalline $LiCoO_2$. The cut off voltage of this battery 10 is well defined and at 3.7 V. The energy density and specific energy of this thin film battery 10, including both the cell and the substrate, is about 340 wh/l and 105 wh/kg, respectively. It is expected that an energy density of more than 700 wh/l and a specific energy of more than 250 wh/kg can be achieved by fabricating the battery cell on both front and back side of a mica substrate. The discharge current of the battery 10 was about 2 mA.

While illustrative embodiments of the thin film battery 10 are described in the present application, it should be understood that other embodiments are also possible. For example, the thin film battery 10 may have a plurality of battery cells arranged horizontally or stacked in a convoluted or non-symmetrical shape depending on the application. Also, the packaging assembly of the present invention can be applied to contain and hermetically seal other type of batteries, as would be apparent to those of ordinary skill in the art. Thus, the scope of the claims should not be limited to the illustrative embodiments.

What is claimed is:

1. A thin film battery manufacturing method comprising:
   (a) annealing a battery substrate comprising mica to a temperature at which organic materials are burned off the battery substrate to clean the battery substrate, the battery substrate comprising a thickness of less than about 100 microns; and
   (b) forming a plurality of thin films on the annealed battery substrate, the thin films comprising at least one electrolyte between a pair of electrodes, and the thin films adapted to generate or store an electrical charge.

2. A method according to claim 1 comprising annealing the battery substrate by heating the battery substrate in air to about 400° C.

3. A method according to claim 1 comprising annealing the battery substrate by heating the battery substrate to a temperature from about 150 to about 600° C.

4. A method according to claim 3 comprising annealing the battery substrate by heating the battery substrate for about 10 minutes.

5. A method according to claim 1 further comprising annealing the battery substrate by heating the battery substrate to a temperature that is sufficiently high to eliminate defects.

6. A method according to claim 1 wherein the battery substrate comprises a thickness of less than 25 microns.

7. A method according to claim 1 comprising forming the thin films on the battery substrate by physical or chemical vapor deposition, oxidation, nitridation or electro-plating.

8. A method according to claim 1 comprising heating the battery substrate to a temperature that is sufficiently high to eliminate defects in the thin films formed on the battery substrate such that battery capacity increases by 10 to 20% and the charge and discharge current increases by more than 50%.

9. A method according to claim 1 wherein (b) comprises:
   (a) placing the battery substrate in a chamber comprising a target composed of $LiCoO_2$;
   (b) introducing a process gas into the chamber;
   (c) energizing the process gas by applying a current at a power density level of from about 0.1 to about 20 W/cm² to the target, thereby sputtering material from the target to deposit onto the battery substrate; and
   (d) exhausting the process gas from the chamber.

10. A method according to claim 9 wherein the chamber comprises a magnetron-sputtering cathode, and the method comprises energizing the process gas by applying a potential across the target and the magnetron-sputtering cathode to form a plasma of the process gas that has an ion flux of from about 0.1 to about 5 mA/cm².

11. A method according to claim 9 comprising maintaining the battery substrate at a potential of from about −5V to about −200 V.

12. A method according to claim 9 further comprising applying a non-uniform magnetic field about the target in the chamber, the non-uniform magnetic field comprising a weaker central magnetic field strength and a surrounding stronger peripheral magnetic field strength.

13. A thin film battery manufacturing method comprising:
   (a) depositing a thin film on a battery substrate comprising mica, the battery substrate comprising a thickness of less than 100 microns, and the thin film comprising an electrode; and
   (b) annealing the thin film by heating the substrate to a temperature from about 150 to about 600° C., and that is sufficiently high to eliminate defects from the thin film.

14. A method according to claim 13 comprising forming the thin film on the battery substrate by physical or chemical vapor deposition, oxidation, nitridation or electro-plating.

15. A method according to claim 13 comprising annealing the battery substrate to a temperature that is sufficiently high to eliminate defects in the thin films such that battery capacity increases by 10 to 20% and the charge and discharge current increases by more than 50%.

16. A thin film battery manufacturing method comprising:
   (a) annealing a battery substrate comprising mica to a temperature at which organic materials are burned off the battery substrate to clean the battery substrate, the battery substrate comprising a thickness of less than about 100 microns;
   (b) forming a thin film on the annealed battery substrate, the thin films comprising an electrode; and
   (c) annealing the thin film by heating the substrate to a temperature from about 150 to about 600° C., and that is sufficiently high to eliminate defects from the thin film.

* * * * *